Oct. 19, 1926.
G. W. CARLETON ET AL
FILM DEVELOPING APPARATUS
Filed Oct. 22, 1920
1,603,512
4 Sheets-Sheet 1
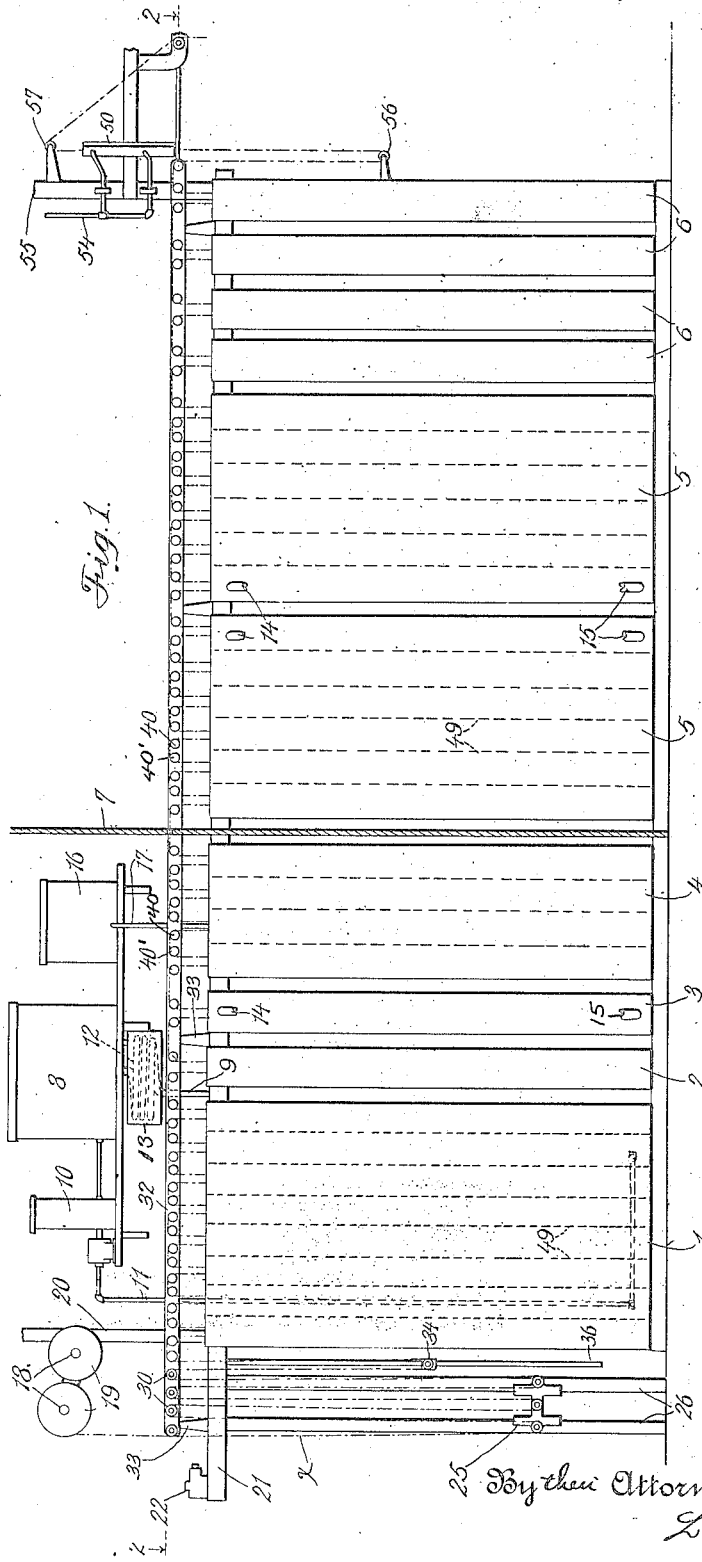
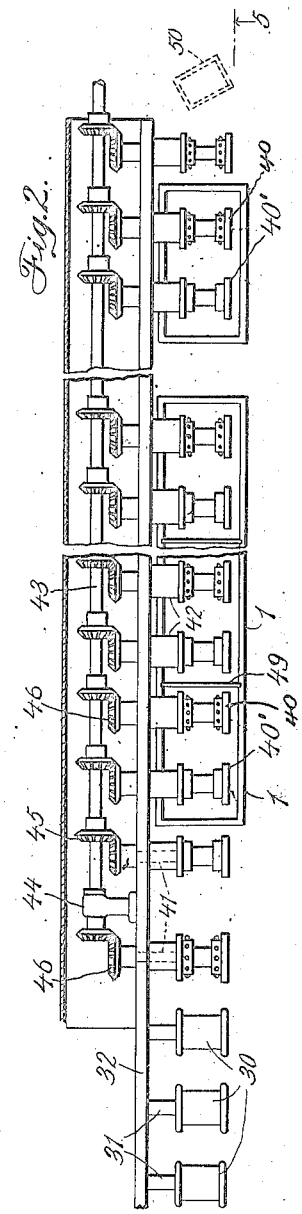
Inventors
G. W. Carleton
H. O. Carleton
By their Attorney
Lewis J. Doolittle

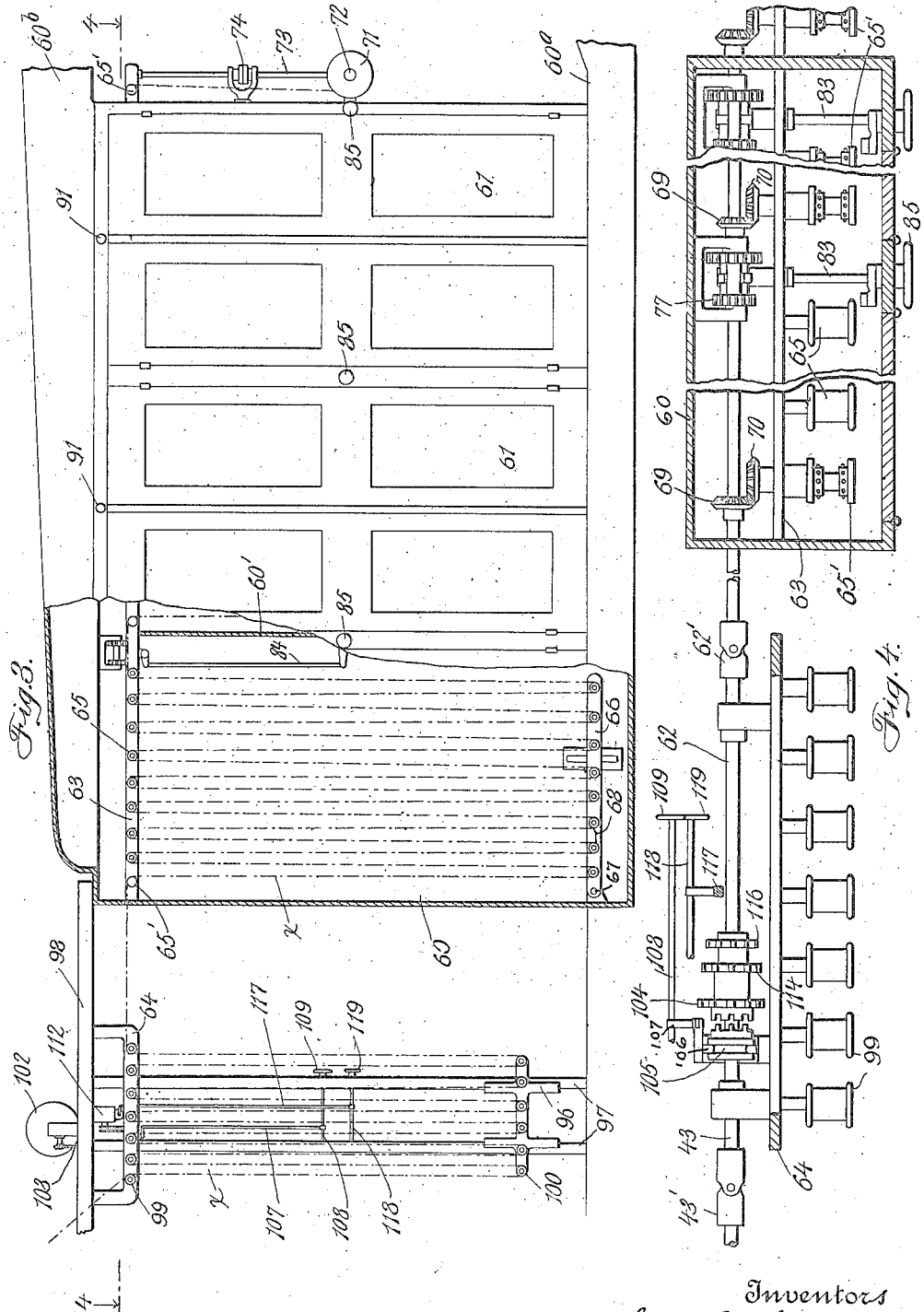

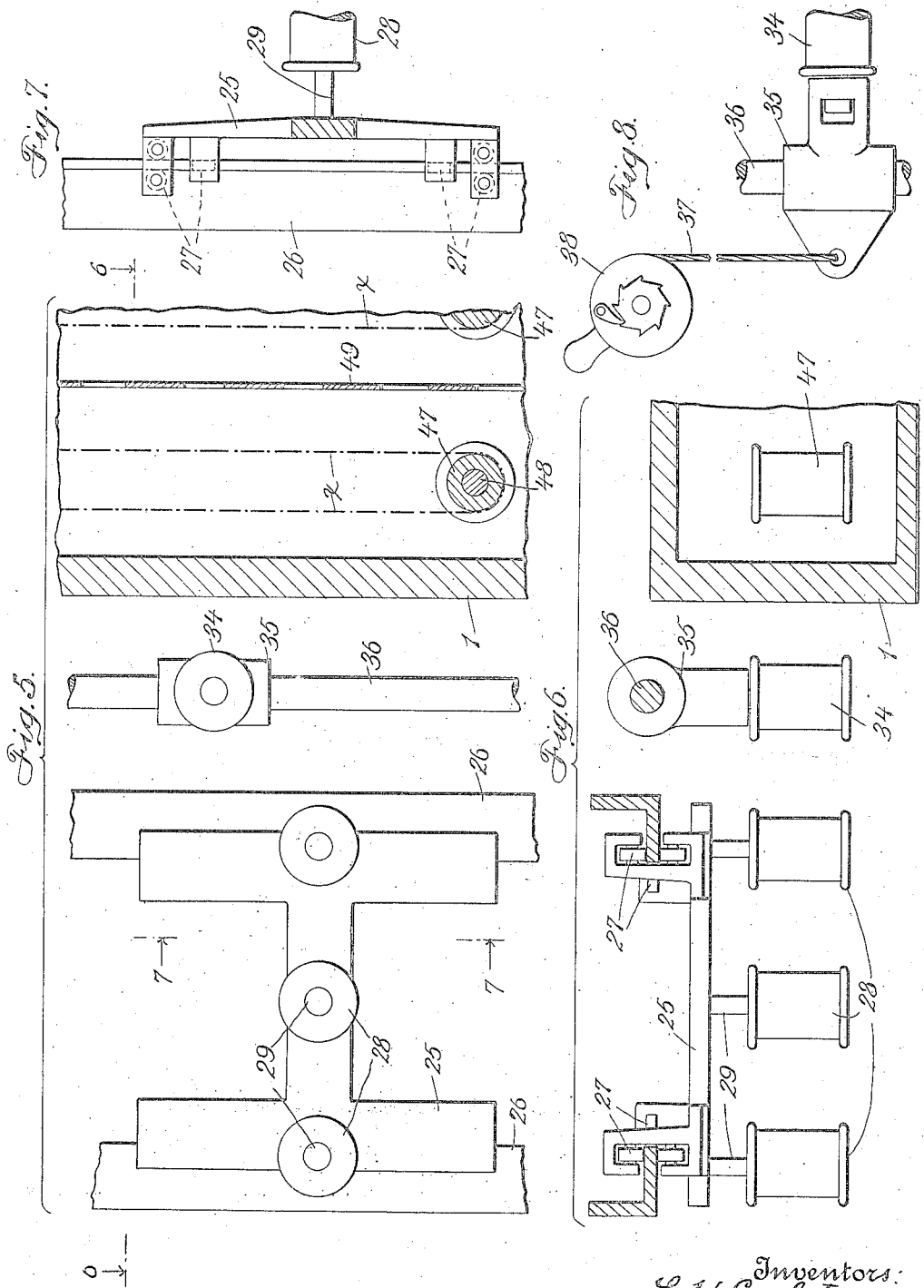

Oct. 19, 1926.
G. W. CARLETON ET AL
1,603,512
FILM DEVELOPING APPARATUS
Filed Oct. 22, 1920
4 Sheets-Sheet 4
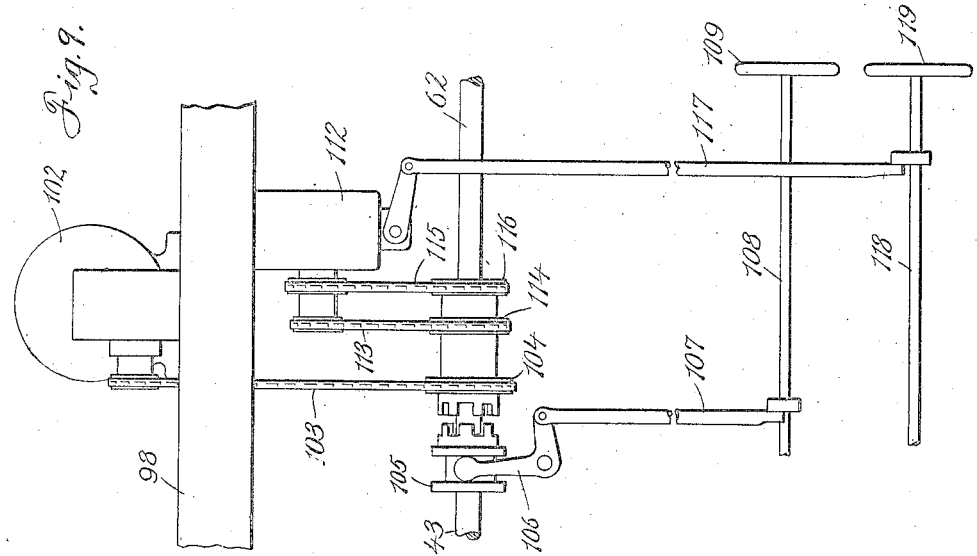

Patented Oct. 19, 1926.

1,603,512

UNITED STATES PATENT OFFICE.

GIDEON W. CARLETON AND HERBERT O. CARLETON, OF NEW YORK, N. Y., ASSIGNORS, BY DIRECT AND MESNE ASSIGNMENTS, TO DUPLEX MOTION PICTURE INDUSTRIES, INC., A CORPORATION OF DELAWARE.

FILM-DEVELOPING APPARATUS.

Application filed October 22, 1920. Serial No. 418,838.

This invention relates to an apparatus for treating motion picture films, being intended more particularly for use in developing the films after exposure of the latter.

The invention has for one object to provide an apparatus of this type in which every point in the length of the film is readily accessible to permit or repair in case of breaking of the film.

A further object is to provide a film treating apparatus which will continue to operate without interruption in the event of breakage of the film and while the latter is being repaired.

A further object is to provide a film treating apparatus which will automatically take care of expansion or shrinkage of the film.

The invention also has, generally speaking, for an object to provide an improved apparatus through which the film may be passed in a continuous, uninterrupted strip.

For further comprehension of the invention, and of the objects and advantages thereof, reference will be had to the following description and accompanying drawings, and to the appended claims in which the various novel features of the invention are more particularly set forth.

Fig. 1 of the drawings is a front view of one portion of the apparatus, certain of the film adjustment elements being omitted.

Fig. 2 is an enlarged fragmentary horizontal section on the line 2—2 of Fig. 1.

Fig. 3 is a front view showing the remainder of the apparatus.

Fig. 4 is an enlarged fragmentary horizontal section on the line 4—4 of Fig. 3, certain of the film adjustment elements being omitted.

Fig. 5 is a fragmentary longtiudinal vertical section on the line 5—5 of Fig. 2.

Fig. 6 is a horizontal section on the line 6—6 of Fig. 5.

Fig. 7 is a detail transverse vertical section on the line 7—7 of Fig. 5.

Fig. 8 is a detail view, taken transversely of the apparatus, of the device by which the time of exposure of the film to the developing solution is varied.

Fig. 9 is a detail front elevation of the power and transmission mechanism.

Our improved apparatus comprises, briefly, a desired number of tanks or receptacles containing the necessary liquids or solutions for treating the film, means for passing the film in succession through said tanks, and means for drying the film. As here shown, we provide a tank 1 containing a developing solution through which the film first passes. Adjacent this tank is a second tank 2 containing a checking solution and adjacent the latter a tank 3 containing water, and then a tank 4 containing a fixing solution. Adjacent the tank 4 are a pair of tanks 5 containing water and adjacent these latter a series of tanks 6 adapted to contain a coloring solution or solutions. These tanks are arranged in longtiudinal alinement with one another and may be of varying length according to the length of time that the film requires to be subjected to the liquid therein. Between the tanks 4 and 5 a partition 7 is placed, the room or compartment in which the tanks 1 to 4 are located being a "dark room." It is to be understood that the precise sequence of tanks is not material to the present invention.

The developing solution is preferably kept in circulation through the tank 1, being here shown as being fed by gravity from an elevated receptacle 8 through a pipe 9 to the top of the tank, being pumped back into the receptacle 8 by a pump 10 connected by a pipe 11 with the bottom of the tank 1. The feed pipe 9 may have therein a coil 12 located in a box 13 containing water or any other medium for controlling the temperature of the solution as it passes to the tank.

The water in tanks 3 and 5 is also preferably kept in circulation, each of these tanks having outlet and inlet pipes 14 and 15 respectively at upper and lower ends thereof which connect to suitable supply and discharge means, not shown. The tanks 2, 4 and 6 may simply be filled with the proper liquid without provision for the continous circulation thereof, a second receptacle 16 being shown beside the receptacle 8 and connected by a pipe 17 with the tank 4.

The film to be treated, which is indicated at X, is fed into the left hand end of tank 1, considered as shown in Fig. 1; a pair of reel supporting arbors 18 being preferably provided above this end of the tank to permit of a pair of reels, indicated at 19, being mounted in position at the same time, these arbors being indicated as supported by a post 20 extending upwardly from a horizontal beam 21 extending along the rear faces of the series of tanks at their upper ends, this beam preferably projecting beyond the tank 1 and having a patching machine 22 of any suitable type mounted thereon.

After leaving the reel 19, and before entering the tank 1, the film is engaged by a movable device which acts to maintain a reserve supply of film which continues feeding through the developer for a limited period in the event of a temporary stoppage of the supply from the reel occasioned by a break in the film as it comes from the reel 17, or the complete unwinding of the film from the reel. This device comprises a crosshead 25, which might be termed an elevator, vertically slidable on a pair of posts 26 which may be secured at their upper ends to the beam 21. The crosshead 25 may be supplied with anti-friction elements 27 which engage the posts 26. This crosshead has mounted thereon a series of flanged rollers 28 which are rotatably mounted on pins 29 fixed in the crosshead, the rollers preferably running on anti-friction bearings. The film coming from the reel 19 is threaded back and forth over these rollers and a second series of like rollers 30 rotatable on pins 31 fixed in a rail 32 which extends longitudinally over the series of tanks and may be suitably supported, as by the legs 33, on the beam 21.

Arranged between the reserve feed device just described and the tank 1 is a device by which the time of exposure of the films to the developing solution may be varied to any minute degree desired. This device comprises a roller 34 similar to the rollers 30 and mounted to rotate freely on a head 35 which is slidable on a vertical rod 36 fixed at its upper end to the beam 21. This head may be adjusted vertically along the rod 36 by any suitable means such as the cord 37 secured at one end to the head 35 and wound at its opposite end on a reel 38, suitably supported by the beam 21.

The means by which the film is passed through the different tanks is as follows: Mounted upon the rail 32 are a series of rollers arranged in pairs, one roller 40 of each pair being toothed to constitute a sprocket wheel of the usual type employed in feeding film, and the other 40' being plain. These rollers are fixed on stub shafts 41 journaled in suitable bearing elements 42 on the rail 32 and are all driven in unison from a longitudinal shaft 43 mounted in suitable bearings, such as 44, carried on the rail 32, this shaft 43 having fixed thereon a series of bevel gears 45 which mesh with like gears 46 on the ends of the stub shafts 41. The film is passed around these rollers, and between each pair thereof a loop is formed in the film, these loops being let down into the tanks and maintained in position by means of weighted rollers 47 at their lower ends which rest loosely upon the film, and are entirely supported by the latter. These rollers may be made of glass, rubber composition with a weighted cover 48, or other suitable material, being provided with the usual flanges at opposite ends to prevent displacement from the film. As the film travels, these rollers 47 roll thereon. As the treatment of the film may require a greater exposure to certain of the liquids than to others provision may be made for this either by making the tanks of varying dimensions, longitudinally of the apparatus, to accommodate a greater or lesser number of the vertical loops or reaches of the film according to the amount of exposure to the different liquids which may be desired, or by providing a series of tanks for each liquid each of which receives one loop of the film. The tanks 1, 4 and 5 are here shown as each receiving a series of the film loops and to avoid any chance of the rollers 47 striking against each other they are preferably separated by the perforated partitions 49. It will be obvious of course that where it may be desired, as for instance in passing the film through the developing solution, to make any considerable change in the time of exposure thereto, the same can be readily effected by decreasing or increasing the number of loops let down into the tank.

When a small degree of adjustment of the time of exposure of the film to the developing solution is desired, the roller 34 is raised or lowered to shorten or lengthen the loop of film in which it is suspended, causing an inverse movement of the film and roller 47 in the adjacent end compartment of the tank 1, it being understood that the combined weight of the roller 34 and head 35 will overbalance the roller 47. As will be apparent, the lengthening or shortening of the loop of film in which this end roller 47 is suspended will vary the time of exposure of the film to the developing solution.

The film coming from the last of the series of tanks may have the surface moisture removed therefrom by an air jet device which is indicated generally at 50. Compressed air may be supplied to this device from a branched pipe 54 leading from any source of supply. This device just described is suitably supported, as by the post 55, adjacent the last of the tanks, the film being here shown as led downwardly around an idle roller 56 supported on the wall of the said tank, then upwardly through the casing 50 and over a roller 57 supported by the post 55, this initial moisture removing means not being claimed as a feature of the invention.

After the exterior moisture has been removed therefrom by the device just described the film then travels through a drying apparatus in which it is completely dried, the construction of this drying apparatus being illustrated in Figs. 3 and 4. Since the film, during the drying thereof, develops an increasing tendency toward breakage we provide a take-up device, similar in construction to the reserve supply device previously described, to take up the film coming from the developer during any temporary stoppage of the travel of the film through the drier due to breakage, and provide for an increase of the speed of travel of the film to remove the excess of film from the said take-up device. We also preferably arrange the drier in sections through which the film successively passes and provide compensating devices in each section to accommodate variation in the length of the film due to shrinkage, patching of broken ends, or other reasons, variable-speed devices being also provided in connection with the individual sections to permit of regulation of the compensating devices. We also provide, in connection with the drive mechanism of the drier, means for varying the rate of travel of the film in the drier as a whole, the control mechanism for the drier and developer being preferably located between these two parts.

Referring to the drier, the latter comprises a cabinet 60 arranged in alinement with the tanks 1 to 6 and which may be provided with glass doors 61 to permit of ready inspection of the film and has the inlet and outlet conduits 60ª and 60ᵇ communicating with the top and bottom thereof, these conduits connecting to a heater or other means for heating or treating the air supplied to the drier. The film is advanced in vertical loops or reaches through the cabinet 60 by means similar in the main to that employed in connection with the developer. This means comprises a horizontal shaft 62 in axial alinement with the shaft 43, and extending longitudinally through the cabinet 60 adjacent the top thereof, being divided into sections to permit of the change of speed above referred to. This shaft is journaled in suitable bearings on a pair of rails 63 and 64, the former of which is supported by the walls of the cabinet. The rail 63 supports a series of rollers 65, 65′ which are spaced throughout the length of the cabinet in the different sections thereof, and over which the upper ends of the loops of the film are passed, the lower ends of the loops being engaged by the compensating devices referred to, of which there is one for each section. Each of these compensating devices comprises an arm 66 hinged at one end, as at 67, to the cabinet to swing in a vertical plane and having mounted thereon a series of rollers 68, the arms normally assuming a horizontal position as shown. The rollers 65 and 68 are similar in construction and mounting to the rollers 30, while the rollers 65′ are similar to the toothed rollers 40 and are driven from the shaft 62 by means of the meshing bevel gears 69 and 70, any requisite number of these toothed rollers 65′ being provided to properly feed the film. In the present instance one of these toothed rollers 65′ is located at the entrance to each section and at the exit end of the last section. The film coming from the drier may be wound upon a reel 71 mounted on an arbor 72 supported on the end of the cabinet and driven by a vertical shaft 73 connected by suitable bevel gearing with the shaft 62 and arbor 72, a slip clutch 74 being placed in the shaft 73.

As above stated, means are provided for varying the speed of travel of the film as it passes from the different sections of the drier, the change speed devices being applied to the shaft 62 at the exit ends of the different sections, that is to say, at the point where the film leaves the last of the rollers 68 on each arm and engages the adjacent roller 65′, to which latter the increased speed may be imparted. Partitions such as 60′ may be provided between the different sections of the drier.

These change speed devices are indicated generally at 77 in Fig. 4 and may be operated from rock shafts 83 by means of links 84, the rock shafts 83 each having a handwheel 85 thereon. The shafts 43 and 62 may be provided with universal joints 43′ and 62′ located one on each side of the transmission mechanism. The drier proper has been made the subject matter of a companion application filed Oct. 22, 1920, Ser. No. 418,839.

The take-up device before referred to may comprise a cross-head 96, of similar construction to the crosshead 25, and slidable on a pair of posts 97 connected at their upper ends to a horizontal frame element 98 which also supports the rail 64. Upon this rail 64 and crosshead 96 are mounted the two series of rollers 99 and 100 respectively, similar to the rollers 30, the film being led from the excess moisture removing device around these rollers in vertical loops and thence to the drier.

Referring now to the means for driving the shafts 43 and 62; this may comprise a motor 102 mounted on the frame element 98, and driving, through any well known reducing gearing, a sprocket chain 103 which is looped over a clutch-faced sprocket wheel 104 free to rotate on shaft 43 and adapted to receive driving engagement therewith from a clutch sleeve 105 feathered on the shaft 43 and movable therealong by a yoke 106, this yoke being operated through arm and linkage means, indicated generally at 107, by a rock shaft 108 on which is fixed a handwheel 109, this rock shaft being supported by the posts 97.

For driving the shaft 62 we preferably provide a three speed transmission mechanism from the motor 102, which mechanism may be of any well known type, and which here comprises a gear box 112, the mechanism in which is connected by a sprocket chain 113 to a second sprocket wheel 114 fixed to the sprocket wheel 104, a sprocket chain 115 connecting the mechanism in box 112 to a third sprocket wheel 116 rigid on shaft 62. The gears in box 112 are shifted by means of the arm and link device 117 from a rock shaft 118 on which is fixed a handwheel 119 and which is also supported by the posts 97. A suitable pointer and indicating marks may be provided in connection with the handwheel 119 for setting the drive at the desired speed. We have not considered it necessary to illustrate or describe the change speed transmission mechanism in greater detail since such mechanisms are well known.

When it is desired to duplicate the apparatus to accommodate two individual strips of film the two apparatus may be conveniently arranged back to back to save space.

It is believed the manner of use of our improved film treating apparatus will be apparent from the above description. It may be said that in the use of the apparatus a leader strip may be fastened to the end of the last film treated at a given time and run through the apparatus to avoid any need of rethreading the next film therethrough. It will be understood that in threading the film through the apparatus it may be twisted as desired to present the blank side thereof to the rollers.

As will be apparent, every point in the film is readily accessible for inspection or repair while provision is made for the continuous passage of the film through the developing section of the apparatus by means of the reserve supply and take up devices at opposite ends thereof. By means of the change speed mechanism for the drier the excess of film collected on the take up device during any temporary stoppage of the drier may be drawn off while the speed variation of the different sections of the drier permits of proper regulation of the film in the different sections to take care of shrinkage or expansion, or change of length due to patching.

What we claim is as follows:—

1. In a film treating apparatus, means for feeding the film through a liquid, a roller freely suspended in a depending loop in the film to hold the same immersed in the liquid, a second roller engaged in a depending loop in the film outside the liquid, and means for supporting said second roller in vertically adjusted positions.

2. In a film treating apparatus, a developer, a drier, separately controllable means for feeding the film in a continuous strip through said developer and drier, a take-up device adapted to accumulate the film passing from said developer when the means for feeding the film through the drier is not operating, said take-up device including a vertically movable guided support carrying a plurality of rollers over which the film is passed in successive loops, and means for varying the rate of travel of the film through the drier to withdraw the excess of film accumulated by the said take-up device.

3. In a film treating apparatus, a tank adapted to contain a liquid, a drier, independently controllable means for passing the film through said tank and drier, and a take-up device adapted to receive the film from said tank during temporary stoppage of the travel of the film through the drier said take-up device including a vertically movable guided support carrying a plurality of rollers over which the film is passed in successive loops.

4. In a film treating apparatus, a tank adapted to contain a liquid, a drier, independently controllable means for passing the film through said tank and drier, a take-up device adapted to receive the film from said tank during temporary stoppage of the travel of the film through the drier, said take-up device including a vertically movable guided support carrying a plurality of rollers over which the film is passed in successive loops, and a change speed device whereby the rate of travel of the film through the drier may be varied relatively to the rate of travel through the tank.

5. In a film treating apparatus, a developer, a drier, and a take-up device for the film interposed between the developer and drier, said device comprising upper and lower groops of rollers around which the film is looped, a vertically movable crosshead supported by the film and carrying the lower group of rollers, and guides for said cross-head.

Signed at New York city, in the county of Kings and State of New York, this 29th day of September, A. D. 1920.

HERBERT O. CARLETON.
GIDEON W. CARLETON.